(12) United States Patent
Hall

(10) Patent No.: US 8,100,384 B1
(45) Date of Patent: Jan. 24, 2012

(54) CARBURETOR SYSTEM

(76) Inventor: Kendall L. Hall, Wadena, MN (US)

(*) Notice: Subject to any disclaimer, the term of this patent is extended or adjusted under 35 U.S.C. 154(b) by 369 days.

(21) Appl. No.: 12/475,669

(22) Filed: Jun. 1, 2009

(51) Int. Cl.
*F02M 19/03* (2006.01)

(52) U.S. Cl. ........ 261/18.2; 261/22; 261/78.1; 261/144; 261/145; 261/DIG. 12; 261/DIG. 55; 261/DIG. 66

(58) Field of Classification Search ............... 261/18.2, 261/22, 78.1, 78.2, 79.1, 79.2, DIG. 12, DIG. 55, 261/DIG. 56, DIG. 66, 143–145
See application file for complete search history.

(56) References Cited

U.S. PATENT DOCUMENTS

| | | | |
|---|---|---|---|
| 860,848 A * | 7/1907 | Bowers | 261/57 |
| 1,562,126 A * | 11/1925 | Saives | 261/41.2 |
| 2,093,960 A * | 9/1937 | Ericson | 123/184.41 |
| 3,802,671 A * | 4/1974 | Klutho | 261/34.2 |
| 3,866,579 A * | 2/1975 | Serruys | 123/25 A |
| 3,940,928 A | 3/1976 | Pozniak et al. | |
| 4,044,742 A | 8/1977 | Linder | |
| 4,046,119 A | 9/1977 | Perry | |
| 4,063,536 A * | 12/1977 | Sanda et al. | 123/25 J |
| 4,141,323 A | 2/1979 | Hart | |
| 4,208,989 A | 6/1980 | Hart | |
| 4,249,501 A | 2/1981 | Ehresmann | |
| 4,283,355 A * | 8/1981 | Herd et al. | 261/44.7 |
| 4,351,289 A | 9/1982 | Renda | |
| 4,374,784 A * | 2/1983 | Kalishman | 261/18.2 |
| 4,376,739 A * | 3/1983 | Passey, Jr. | 261/142 |
| 4,387,685 A * | 6/1983 | Abbey | 123/439 |
| 4,391,229 A | 7/1983 | Turner | |
| 4,391,230 A * | 7/1983 | Pesce et al. | 123/25 E |
| 4,424,789 A | 1/1984 | Spalding | |
| 4,448,170 A | 5/1984 | O'Hara | |
| 4,503,671 A | 3/1985 | Smith | |
| 4,800,848 A | 1/1989 | Hubbard | |
| 5,863,470 A * | 1/1999 | Grant | 261/23.2 |
| 7,090,203 B2 * | 8/2006 | Goto | 261/22 |
| 2006/0151891 A1 * | 7/2006 | Meyer | 261/18.2 |
| 2006/0175719 A1 * | 8/2006 | DeLisle | 261/66 |
| 2009/0013963 A1 | 1/2009 | Eberhardt et al. | |

FOREIGN PATENT DOCUMENTS

JP 54-25333 A * 2/1979

* cited by examiner

*Primary Examiner* — Richard L Chiesa
(74) *Attorney, Agent, or Firm* — Neustel Law Offices

(57) ABSTRACT

A carburetor for increasing the efficiency and horse power of an internal combustion engine. The carburetor generally includes a body including a throat extending therethrough, a deflector plate extending inwardly towards a cross-sectional center within the throat, a venturi member extending within the throat downstream of the deflector plate and including a channel fluidly connected thereof, and a throttle plate disposed within the throat downstream of the venturi member. The deflector plate is directed towards the channel to redirect at least a portion of an air stream entering the throat through the channel to mix with a fuel stream injected within the channel. A water supply line injects a hot water stream within the throat downstream of the venturi member, wherein the hot water stream mixes with the fuel stream to atomize the fuel stream for vaporization within the internal combustion engine.

1 Claim, 6 Drawing Sheets

CARBURETOR SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to internal combustion engines and more specifically it relates to a carburetor system for increasing the efficiency and horse power of an internal combustion engine.

2. Description of the Related Art

Any discussion of the related art throughout the specification should in no way be considered as an admission that such related art is widely known or forms part of common general knowledge in the field.

Internal combustion engines have been around for years and are used in a wide variety of applications including vehicles as well as many other types of machinery. Carburetors are used with the internal combustion engines to blend an air and fuel mixture within the throat of the carburetor.

Various advances in carburetors have been made over the years to try to enhance fuel efficiency and horse power generated. However, the need for a more efficient internal combustion engine that does not drastically reduce the amount of horse power outputted is still needed. Thus, because of the inherent problems with the related art, there is a need for a new and improved carburetor system for increasing the efficiency and horse power of an internal combustion engine.

BRIEF SUMMARY OF THE INVENTION

A system for increasing the efficiency and horse power of an internal combustion engine. The invention generally relates to an engine which includes a body including a throat extending therethrough, a deflector plate extending inwardly towards a cross-sectional center within the throat, a venturi member extending within the throat downstream of the deflector plate and including a channel fluidly connected thereof, and a throttle plate disposed within the throat downstream of the venturi member. The deflector plate is directed towards the channel to redirect at least a portion of an air stream entering the throat through the channel to mix with a fuel stream injected within the channel. A water supply line injects a hot water stream within the throat downstream of the venturi member, wherein the hot water stream mixes with the fuel stream to atomize the fuel stream for vaporization within the internal combustion engine.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
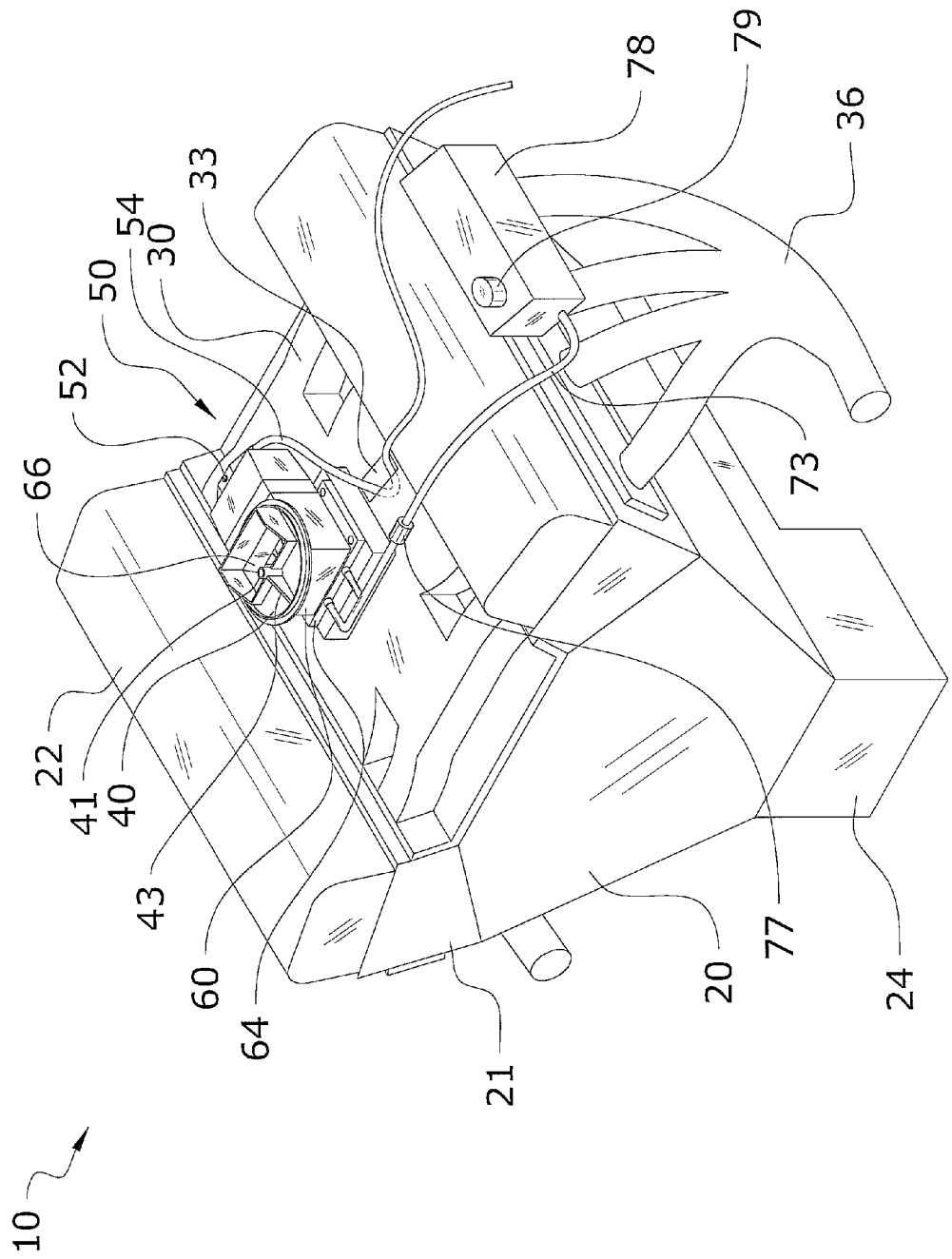
FIG. 1 is an upper perspective view of the present invention.
Figure 2:
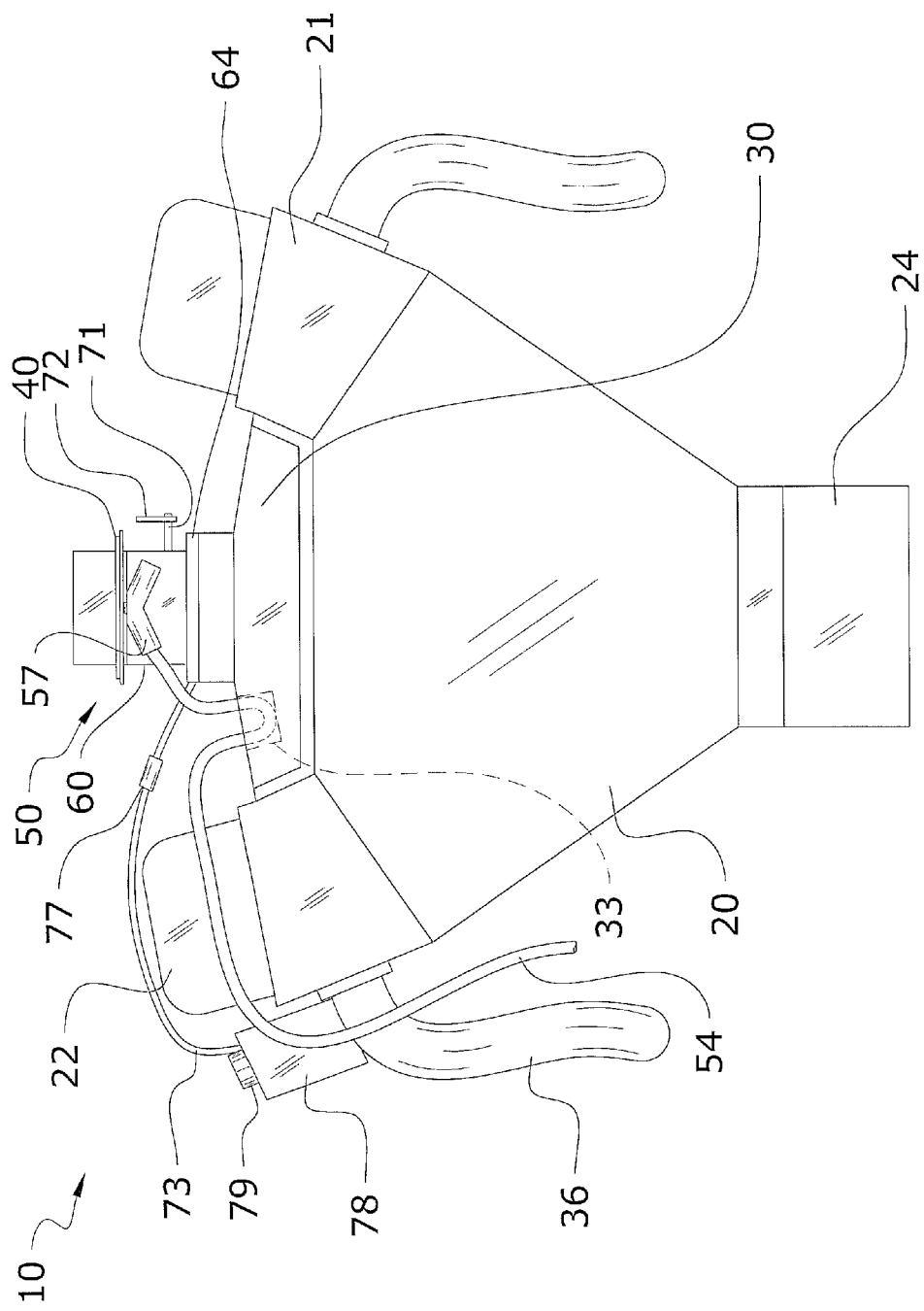
FIG. 2 is a front view of the present invention.
Figure 3:
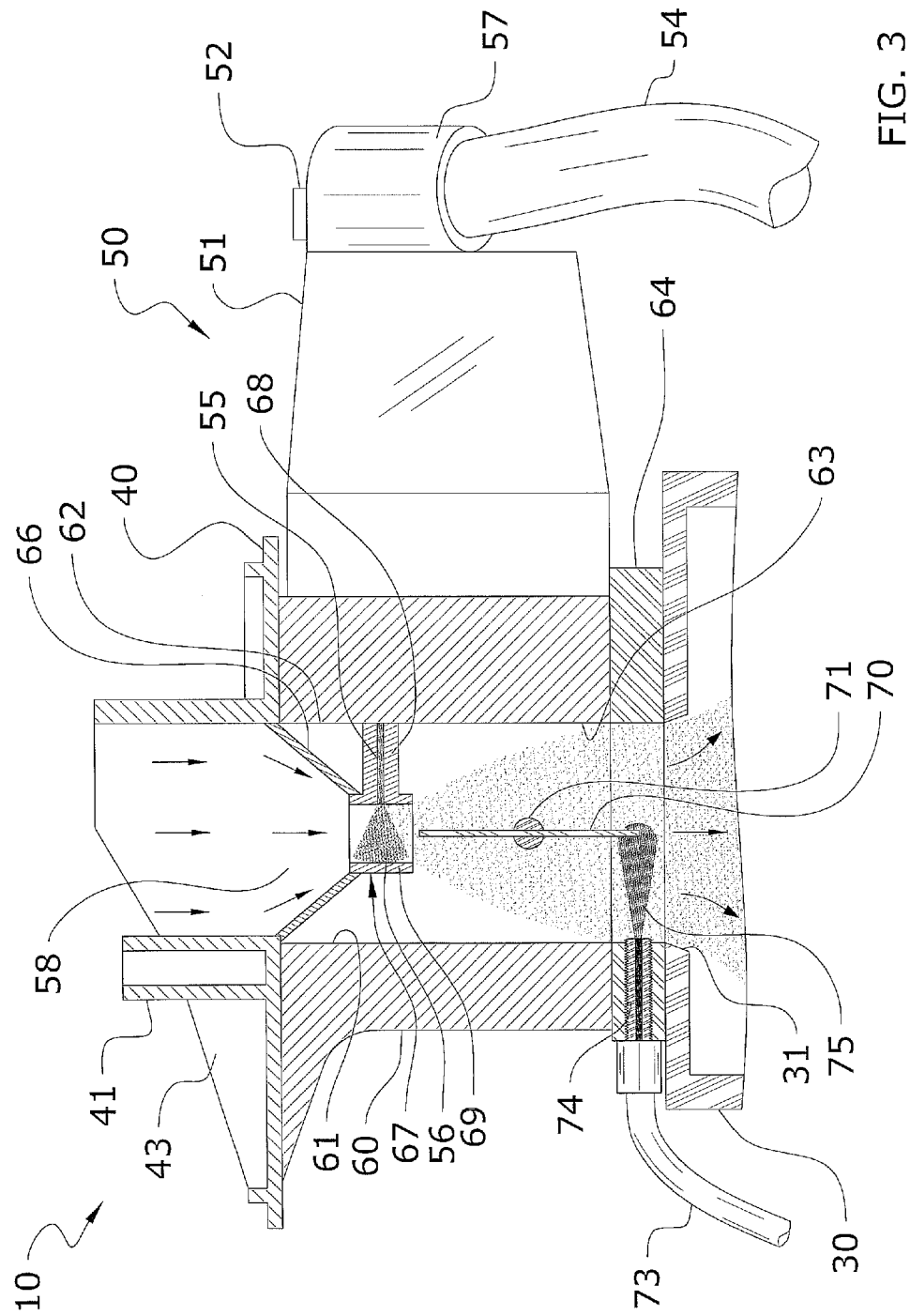
FIG. 3 is a sectional view of the present invention illustrating the air stream being forced through the venturi member and the fuel and air mixture mixing with the water stream.
Figure 4:
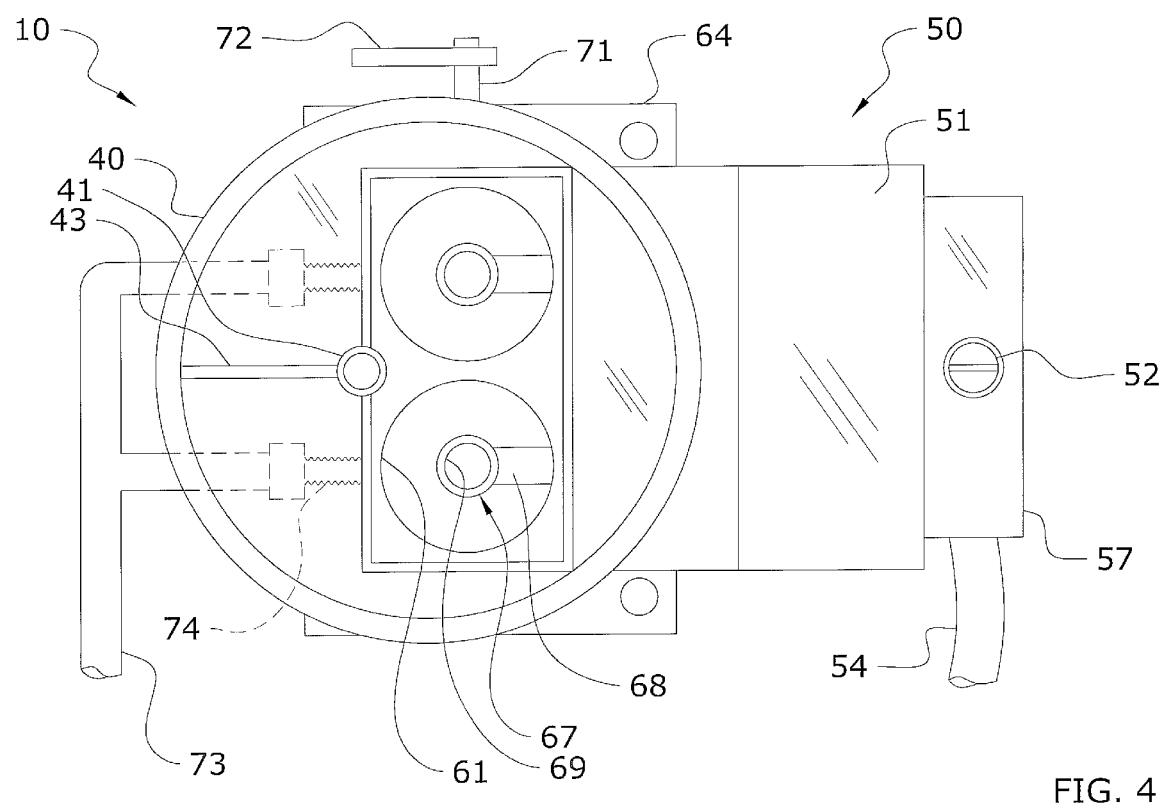
FIG. 4 is a top view of the present invention illustrating no deflector plate.
Figure 5:
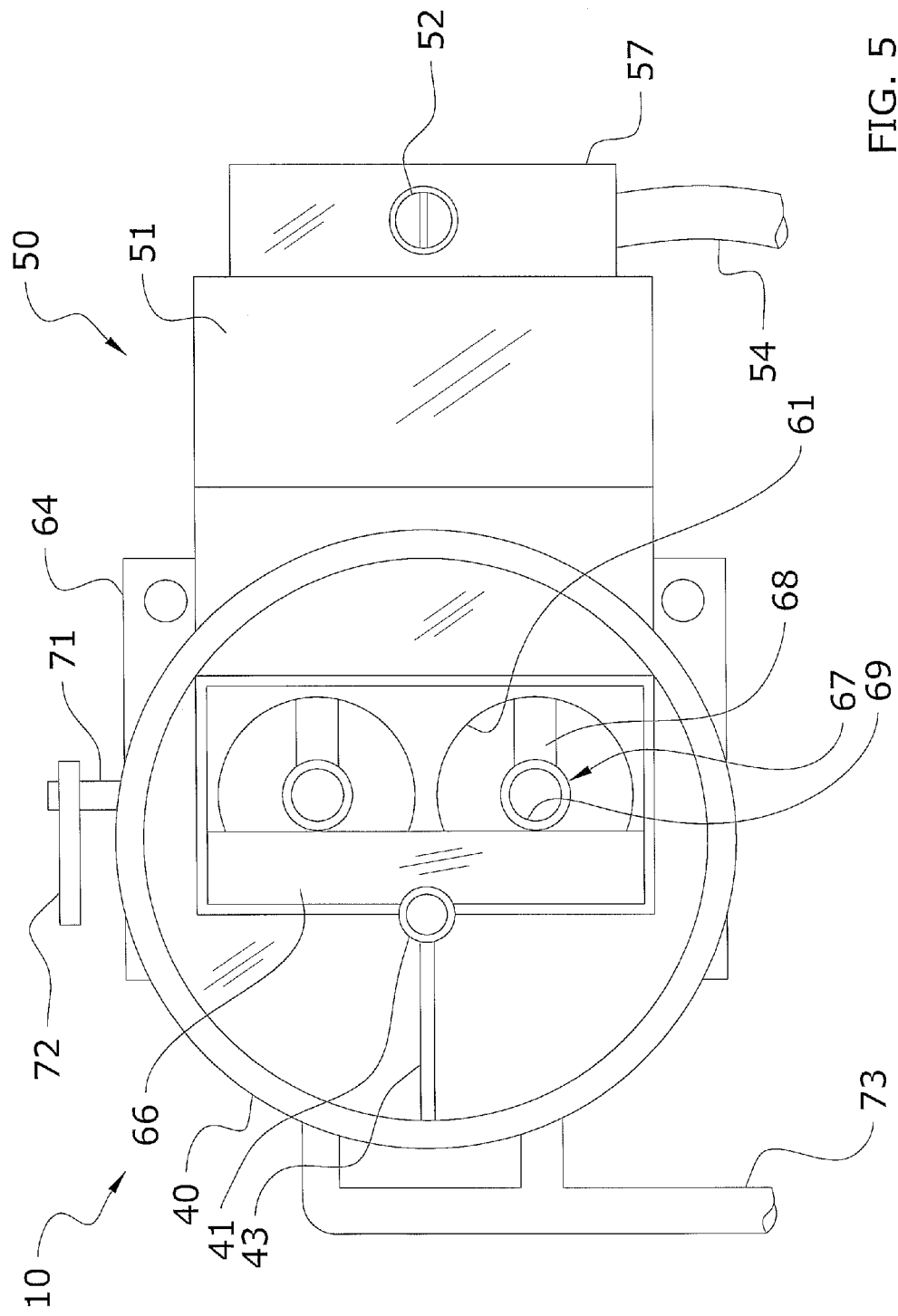
FIG. 5 is a top view of the present invention illustrating a first embodiment of the deflector plate.
Figure 6:
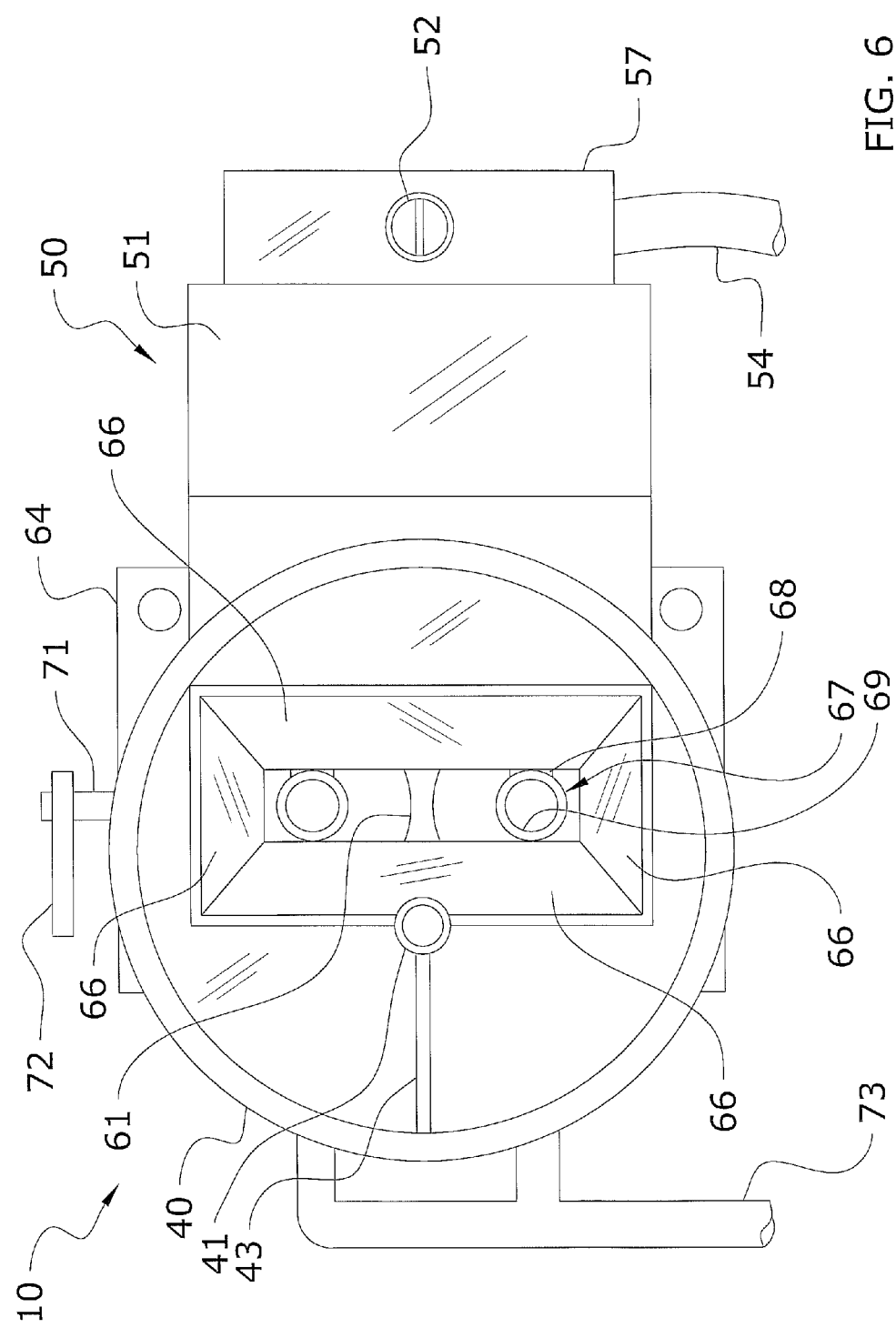
FIG. 6 is a top view of the present invention illustrating a second embodiment of the deflector plate.

Turning now descriptively to the drawings, in which similar reference characters denote similar elements throughout the several views, FIGS. 1 through 6 illustrate a carburetor system 10, which comprises a body 60 including a throat 61 extending therethrough, a deflector plate 66 extending inwardly towards a cross-sectional center within the throat 61, a venturi member 67 extending within the throat 61 downstream of the deflector plate 66 and including a channel extending through a channel member 69 fluidly connected to the throat 61, and a throttle plate 70 disposed within the throat 61 downstream of the venturi member 67. The deflector plate 66 is directed towards the channel of the channel member 69 to redirect at least a portion of an air stream 58 entering the throat 61 through the channel to mix with a fuel stream 56 injected within the channel. A water supply line 73 injects a hot water stream 75 within the throat 61 downstream of the venturi member 67, wherein the hot water stream 75 mixes with the fuel stream 56 to atomize the fuel stream 56 for vaporization within the internal combustion engine. It is appreciated that other liquids may be used alternately than water to atomize the fuel.

FIG. 1 illustrates an engine block 20 having valve heads 21 and valve covers 22 similar to a standard internal combustion type engine. An oil pan 24 is illustrated extending from a lower end of the engine block 20. Various types and sizes of engines may be used with the present invention, such as those in racing or stock cars, economy cars, recreational vehicles or various other types of vehicles. The internal combustion engine may be a V-type, transverse, straight-in-line or various other types. The present invention may be built with a new engine or retrofitted to an existing engine.

An intake manifold 30 and exhaust manifolds 36 lead to and from the engine block 20 and valve heads 21 to supply the engine block 20 with the air/fuel/water mixture and allow the release of hot exhaust gases. The interconnectivity of the intake manifold 30 and the exhaust manifold 36 with the novel features of the carburetor 50 system will be described subsequently.

An air cleaner frame 40 is also illustrated as being connected to the upper end of the carburetor 50. The air cleaner frame 40 generally has an air filter or other collection device attached thereto. The lid of the air cleaner frame 40 may attach to the connector 41 in various ways, such as threadable. Various supports 43 may also be extending therethrough. The air cleaner frame 40 and air cleaner may also include various ports for more efficiently directing air through thereof to be directed within the throat 61 of the carburetor 50, wherein, as shown in the Figures, the air cleaner frame 40 substantially aligns with the throat 61 of the carburetor 50.

B. Carburetor

The carburetor 50 rests atop the intake manifold 30 and is secured or molded thereto. The carburetor 50 includes a float chamber 51 to receive a fuel supply line 54 through a coupler 58. The float chamber 51 has a float adjustment 52. The float chamber 51 may be comprised of various types common to carburetors 50. The body 60 of the carburetor 50 has a throat 61 extending therethrough to fluidly connect with an intake opening 31 of the intake manifold 30.

The throat 61 provides the passageway for the air stream 58, the fluid stream and the water stream 75 to enter within the carburetor 50, wherein the air stream 58, the fluid stream, and the water stream 75 preferably enter the throat 61 separately and mix together therein. The throat 61 is generally oriented in a vertical orientation; however it is appreciated that horizontal orientations may be used. The throat 61 is also generally uniform in diameter.

The air stream 58 enters the throat 61 of the body 60 of the carburetor 50, upstream of a venturi member 67, preferably through the air cleaner or other air flow arrangement to direct air within the throat 61 of the carburetor 50. The entrance to the throat 61 is substantially narrowed via at least one or a plurality of deflector plates 66 (referred to herein in singular form, wherein the deflector plats may a one piece structure or multiple piece structure). The deflector plate 66 angles inwardly (approximately 45 degrees) from an upstream portion 62 of the throat 61 to a downstream portion 63 of the throat 61 (towards the intake manifold 30). The deflector plate 66 substantially narrows the diameter that the air stream 58 is able to flow within and thus substantially decrease a volume of the air stream 58 that is able to flow through the throat 61 towards the intake manifold 30. The deflector plate 66 forces concentration of the air stream 58 by forcing the air stream 58 through the venturi member 67 and allows for a better mixture of the air stream 58 and the fuel stream 56.

Various configurations and shapes of deflector plate 66 may be used within the throat 61. In one configuration, the deflector plate 66 only angularly extends from a forward side or one side/area of the throat 61 to the venturi member 67 so as to extend around a first portion of a perimeter of the throat 61 to permit a first flow volume downstream the throat 61. This embodiment is preferably used for performance vehicles, such as race cars, because the diverter increases the efficiency by directing some of the air stream 58 through the channel but not all of the air stream 58 through the channel.

In another embodiment, the deflector plate 66 extends from all sides or around the entire perimeter of the throat 61 to the venturi member 67 forming an hourglass shape so that the only air of the air stream 58 that is able to flow downstream must pass through the venturi member 67 thus extending around a second portion of the perimeter of the throat 61 to permit a second flow volume downstream the throat 61, wherein the second flow volume is less than the first flow volume. The second portion preferably comprised a circumference of the throat 61. This embodiment is preferably used when desiring to increase fuel efficiency as much as possible, such as in an economy vehicle, by forcing all of the air stream 58 through the channel thus limiting the amount of fuel injected within the channel. It is appreciated that the deflector plate 66 may extend around the perimeter in various other degrees or portions. The deflector plate 66 may be comprised of an integral structure or multiple plates arranged in a desired pattern.

Directly downstream of the deflector plate 66 is the venturi member 67. The venturi member 67 transversely extends within the throat 61 of the body 60 from the float chamber 51. The annular venturi member 67 includes a fuel conduit member 68 having a fuel jet 55 for directing the fuel stream 56 towards the center of the throat 61 and a channel member 69 including a channel extending therefrom for retaining the fuel stream 56 within the center of the throat 61 when sprayed from the fuel conduit member 68. As the fuel stream 56 engages the perimeter of the channel, the fuel stream 56 breaks into smaller particles that more easily mix with the air stream 58 also traveling through the channel.

The channel of the channel member 69 is concentric and parallel with the throat 61 so that the air stream 58 is able to travel smoothly along the deflector plate 66 and through the channel toward the intake manifold 30. Again, the air stream 58 is forced to mix with the fuel stream 56 within the channel of the venturi member due to the orientation of the deflector plate 66 guiding the air stream 58 within the channel.

Downstream of the venturi member 67 including the channel is a throttle plate 70, which may resemble a Butterfly valve among other configurations. The throttle plate 70 rotates on a valve shaft 71 that is connected to a throttle linkage 72 and serves to lessen or increase a size of a cross-sectional flow area through the throat 61 thus allowing a lesser or greater amount of fuel and air mixture of the fuel stream 56 and the air stream 58 to pass through.

A base 64 is preferably secured between the body 60 portion of the carburetor 50 and the upper end of the intake manifold 30, or at least in line with the flow of the fuel and air mixture towards the intake manifold 30. The jet 74 may be removably or securely attached within the base 64 through various manners, such as threadable. Extending through the base 64 is the jet 74 of the water supply line 73, which the water supply line 73 connects thereto. The jet 74 is directed within the lower portion 63 of the throat 61 which extends through the base 64 to fluidly connect the rest of the throat 61 with the opening 31 of the intake manifold 30.

The jet 74 directs the water stream 75 within the lower portion 63 of the throat 61 to mix with the fuel and air mixture upstream of the intake manifold 30 and downstream of the venturi member 67. The mixture of the water stream 75 with the fuel stream 56 and air stream 58 of the fuel and air mixture is used to better break up the fuel and air mixture thus providing better burning of the fuel. It is appreciated that the flow volume of the throat 61 is able to increase after the channel of the venturi member 67 to encompass the entire width of the throat 61. The jet 74 for the water stream 75 is substantially smaller than a jet 55 for the fuel stream 56, wherein the amount of the water stream 75 injected within the throat 61 is about half of the amount of the fuel stream 56 that is injected within the throat 61 at any given time. Again, the water stream 75 breaks apart the fuel stream 56 and air stream 58 mixture to further atomize the fuel stream 56 thus allowing for more efficient burning of the fuel. A water filter 77 is also preferably located along the water supply line 73 to ensure only purified water is injected within the throat 61 of the carburetor 50.

The water stream 75 is preferably heated to create steam which creates more power for the engine. In the preferred embodiment, the water stream 75 flows from a refillable container 78 which includes a removable cap 79. The water within the container 78 is heated via positioning the container 78 next to or directly on a heating element, which in the preferred embodiment is the exhaust manifold 36. As the exhaust manifold 36 heats up, the container 78 and water within are also heated, thus allowing a hot water stream 75 to flow through the water supply line 73 to within the throat 61 of the carburetor 50. The heated water stream 75 thus provides for both a hotter substance to add to the fuel so that the fuel vaporizes quicker and remains hot to burn better, and to be able to convert to steam when used by the internal combustion engine.

In the preferred embodiment, the fuel stream 56 within the fuel supply line 54 is also heated via a heater portion. Prior to fluidly entering the throat 61 of the carburetor 50, the fuel supply line 54 is positioned within the crossover portion 33 of the exhaust ports. The fuel supply line 54 is then heated via being positioned within the hot crossover portion 33, or in addition or separately, a heater portion may be used to heat the fuel supply line 54 and thus fuel stream 56 within. When positioned within the exhaust crossover portion 33, the fuel supply line 54 is bent in a U-shape as illustrated. The hot fuel stream 56 will help to vaporize the fuel mixture (i.e. fuel, air, and water) quicker thus providing a more efficient internal combustion engine and help to keep the hot water stream 75 warm.

C. Operation of Preferred Embodiment

In use, the air stream 58 is directed through the air cleaner and within the upper portion 62 of the throat 61. As the air stream 58 enters the upper portion 62, the air stream 58 is directed inwards via a tapering or inwardly angling deflector. The air stream 58 is directed towards a center of the throat 61, thus creating a bottleneck effect, and within the channel of the venturi member.

Once within the channel, the air stream 58 and the injected fuel stream 56 mix. As the fuel stream 56 hits the perimeter of the channel, the fuel stream 56 atomizes thus making for a better mixture with the air stream 58. The mixed air stream 58 and fuel stream 56 continue to flow downstream past the throttle plate 70 as regulated and towards the opening 31 of the intake manifold 30. The fuel stream 56 is also heated via travelling through the exhaust crossover portion 33 to vaporize more quickly thus burning more efficiently and to keep the water stream 75 warm.

Near the end of the throttle plate 70 or after the throttle plate 70 (with respect to flow), the water stream 75 is injected within the lower portion 63 of the throat 61 to mix with the mixture of air and fuel of the air stream 58 and the fuel stream 56. The water stream 75 further helps to separate the particles of the fuel so that the fuel may be more easily vaporized. The water stream 75 is also heated to keep the fuel at a heated temperature for easier vaporization and to more easily convert to steam within the internal combustion engine for a more efficient running engine. The mixed water, air, and fuel of the water stream 75, air stream 58, and fuel stream 56 subsequently flow downstream within the opening 31 of the intake manifold 30 to enter the engine block 20 to be supplied to the cylinders.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A carburetor for an internal combustion engine, comprising:
   a body including a throat extending therethrough;
   a deflector plate extending within said throat, wherein said deflector plate extends inwardly towards a cross-sectional center of said throat;
   wherein said deflector plate angles inwardly and downstream;
   a venturi member extending within said throat downstream of said deflector plate, wherein said venturi member includes a channel fluidly connected to said throat;
   wherein said venturi member extends transversely within said throat;
   wherein said deflector plate is directed toward said channel;
   wherein said channel is concentric with said throat;
   a fuel supply line to inject a fuel stream within said channel for flowing downstream said throat;
   a throttle plate disposed within said throat downstream of said venturi member;
   a water supply line to inject a hot water stream within said throat downstream of said venturi member, wherein said hot water stream mixes with said fuel stream to atomize said fuel stream for vaporization within said internal combustion engine;
   wherein said deflector plate redirects at least a portion of an air stream entering said throat through said channel of said venturi member to mix with said fuel stream within said channel;
   a heater portion to heat said fuel stream prior to injection within said channel;
   wherein said heater portion is comprised of an exhaust port of said internal combustion engine;
   wherein said fuel stream travels through a fuel line, wherein said fuel line is formed in a U-shape at said heater portion;
   wherein a first amount of said injected fuel stream is comprised of a greater volume than a second amount of said injected hot water stream; and
   a refillable container to supply said water supply line with said hot water stream;
   wherein said refillable container is positioned upon a heating element to heat said hot water stream;
   wherein said heating element is comprised of an exhaust manifold;
   wherein said water supply line is injected downstream of said throttle plate.

* * * * *